US012311850B2

(12) United States Patent
Nakano et al.

(10) Patent No.: US 12,311,850 B2
(45) Date of Patent: May 27, 2025

(54) VEHICLE EXTERIOR PART

(71) Applicant: TOYODA GOSEI CO., LTD., Kiyosu (JP)

(72) Inventors: Hiroyuki Nakano, Kiyosu (JP); Akihiro Hirose, Kiyosu (JP); Kazuki Takao, Kiyosu (JP); Kozo Hirotani, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 313 days.

(21) Appl. No.: 17/961,615

(22) Filed: Oct. 7, 2022

(65) Prior Publication Data

US 2023/0118635 A1    Apr. 20, 2023

(30) Foreign Application Priority Data

Oct. 14, 2021  (JP) ................. 2021-168793

(51) Int. Cl.
*B60R 13/00* (2006.01)
*B32B 3/30* (2006.01)
(Continued)

(52) U.S. Cl.
CPC ................ *B60R 13/04* (2013.01); *B32B 3/30* (2013.01); *B32B 7/023* (2019.01); *B32B 27/08* (2013.01);
(Continued)

(58) Field of Classification Search
CPC ... B60R 13/04; B60R 13/005; B32B 2605/00; B32B 2307/412; B32B 2451/00
See application file for complete search history.

(56) References Cited

U.S. PATENT DOCUMENTS

2020/0371203 A1   11/2020  Hirotani et al.
2021/0155168 A1*  5/2021  Hirotani ................ G09F 21/048
(Continued)

FOREIGN PATENT DOCUMENTS

| JP | 6719506 B2 | 7/2020 |
| JP | 2020-190504 A | 11/2020 |
| JP | 2021-043019 A | 3/2021 |

OTHER PUBLICATIONS

Office Action dated May 14, 2024, issued in corresponding Japanese Patent Application No. 2021-168793 (and English translation).

*Primary Examiner* — Daniel J Colilla
(74) *Attorney, Agent, or Firm* — Posz Law Group, PLC

(57) ABSTRACT

A vehicle exterior part includes a decoration body including a layer structure formed by laminating layers in a front-rear direction, and includes a heater sheet including a transparent sheet base and a heater wire. The decoration body includes a transparent resin layer at a frontmost part of the decoration body and a decorative layer located rearward from the transparent resin layer. The transparent resin layer includes a general portion and an outer edge. A front surface of the general portion includes a general surface. The outer edge includes a bend surface that is curved or angular to a larger extent than the general surface. The sheet base includes a body located in front of the transparent resin layer and an extension extending from a periphery of the body. The body and a portion of the heater wire arranged on the body are located in front of only the general surface.

4 Claims, 8 Drawing Sheets

(51) Int. Cl.
*B32B 7/023* (2019.01)
*B32B 27/08* (2006.01)
*B32B 27/18* (2006.01)
*B60R 13/04* (2006.01)
*H05B 3/56* (2006.01)

(52) U.S. Cl.
CPC ............ *B32B 27/18* (2013.01); *B60R 13/005* (2013.01); *H05B 3/56* (2013.01); *B32B 2307/4026* (2013.01); *B32B 2307/412* (2013.01); *B32B 2451/00* (2013.01); *B32B 2605/00* (2013.01)

(56) References Cited

U.S. PATENT DOCUMENTS

| | | |
|---|---|---|
| 2021/0159592 A1 | 5/2021 | Kawashima et al. |
| 2021/0370849 A1* | 12/2021 | Yamada ................. H05B 3/286 |

\* cited by examiner

VEHICLE EXTERIOR PART

BACKGROUND

1. Field

The present disclosure relates to a vehicle exterior part (such as an emblem, an ornament, or a mark) that decorates a vehicle.

2. Description of Related Art

In vehicles equipped with a millimeter wave radar device, the device transmits millimeter waves toward the outside of the vehicle. The millimeter waves that have struck and been reflected by an object outside the vehicle including, for example, a vehicle leading the above vehicle and pedestrians, are received by the millimeter wave radar device. Using the transmitted and received electromagnetic waves, the millimeter wave radar device recognizes the object and detects the distance between the vehicle and the object, the relative speed, and the like.

The vehicle includes a vehicle exterior part (e.g., an emblem). The vehicle exterior part is located in front of the millimeter wave radar device in a direction in which millimeter waves are transmitted. The vehicle exterior part includes a decoration body that decorates the vehicle and permits the passage of millimeter waves. The decoration body includes a layer structure that is formed by laminating layers in a front-rear direction.

The decoration body includes a transparent resin layer at the frontmost part of the decoration body and a decorative layer located rearward from the transparent resin layer. The transparent resin layer includes a general portion and an outer edge located around the general portion. At least the front surface of the general portion includes a general surface that is flat or curved. The outer edge includes a bend surface that is curved or angular to a larger extent than the general surface.

In the vehicle exterior part, when ice and snow adhere to the vehicle exterior part, millimeter waves attenuate. This lowers the detection performance of the millimeter wave radar device. To solve this problem, the vehicle exterior part may additionally include a snow-melting function. For example, a heater sheet is arranged in front of the transparent resin layer (see Japanese Patent No. 6719506). The heater sheet includes a transparent sheet base and a heater wire arranged on the sheet base. The heater wire generates heat when energized. The sheet base includes a body located in front of the transparent resin layer and an extension extending from the periphery of the body. The heater wire is arranged on the body and the extension. The heater wire is supplied with power at the extension.

In the vehicle exterior part, the heater wire generates heat when energized. Thus, even if ice and snow adhere to the vehicle exterior part, the heat generated by the heater wire melts the ice and snow. This prevents millimeter waves from being attenuated due to the adhesion of the ice and snow.

The heater sheet is arranged in close contact with the transparent resin layer. Due to this arrangement, when the body of the sheet base is formed into a shape that corresponds to the shapes of the general surface and the bend surface, the following problem would occur.

Since the bend surface of the outer edge is curved or angular to a larger extent than the general surface, it is difficult to accurately form the body into a shape that corresponds to the bend surface.

In addition, when the heater sheet is used as an insert to form the transparent resin layer by molding resin, it is difficult to accurately arrange, in a mold, the body formed in the above manner while maintaining the body so as to have a shape corresponding to the bend surface.

Such a problem may occur not only in the millimeter wave radar device, but also in a vehicle exterior part which is incorporated in a vehicle with a device that transmits and receives electromagnetic waves used to detect an object outside the vehicle and in which a heater sheet is arranged in front of the transparent resin layer. The same problem may occur also in a vehicle exterior part which is incorporated in a vehicle without a device that transmits and receives electromagnetic waves and in which a heater sheet is arranged in front of the transparent resin layer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A vehicle exterior part that solves the above problem includes a decoration body configured to decorate a vehicle, the decoration body including a layer structure that is formed by laminating layers in a front-rear direction, and a heater sheet that includes a transparent sheet base and a heater wire that is arranged on the sheet base, the heater wire generating heat when energized. The decoration body includes a transparent resin layer at a frontmost part of the decoration body and a decorative layer located rearward from the transparent resin layer. The transparent resin layer includes a general portion and an outer edge located around the general portion. A front surface of the general portion includes a general surface, the general surface being flat or curved. The outer edge includes a bend surface, the bend surface being curved or angular to a larger extent than the general surface. The sheet base includes a body located in front of the transparent resin layer and an extension extending from a periphery of the body. The heater wire is arranged on the body and the extension, the heater wire being supplied with power at the extension. The body and a portion of the heater wire arranged on the body are located in front of only the general surface.

Other features and aspects will be apparent from the following detailed description, the drawings, and the claims.

BRIEF DESCRIPTION OF DRAWINGS

FIG. 7 is a partial cross-sectional side view showing the cross-sectional structure in a direction corresponding to line 7-7 in FIG. 1, together with a power-supplying device and the like.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle exterior part applied to an emblem 14 that is coupled to the front part of a vehicle 10 according to an embodiment will now be described with reference to the drawings.

In the following description, the direction in which the vehicle 10 travels forward will be referred to as the front, and the reverse direction will be referred to as the rear. The up-down direction refers to the up-down direction of the vehicle, and the left-right direction refers to the width direction of the vehicle that coincides with the left-right direction when the vehicle is traveling forward.

Figure 3:
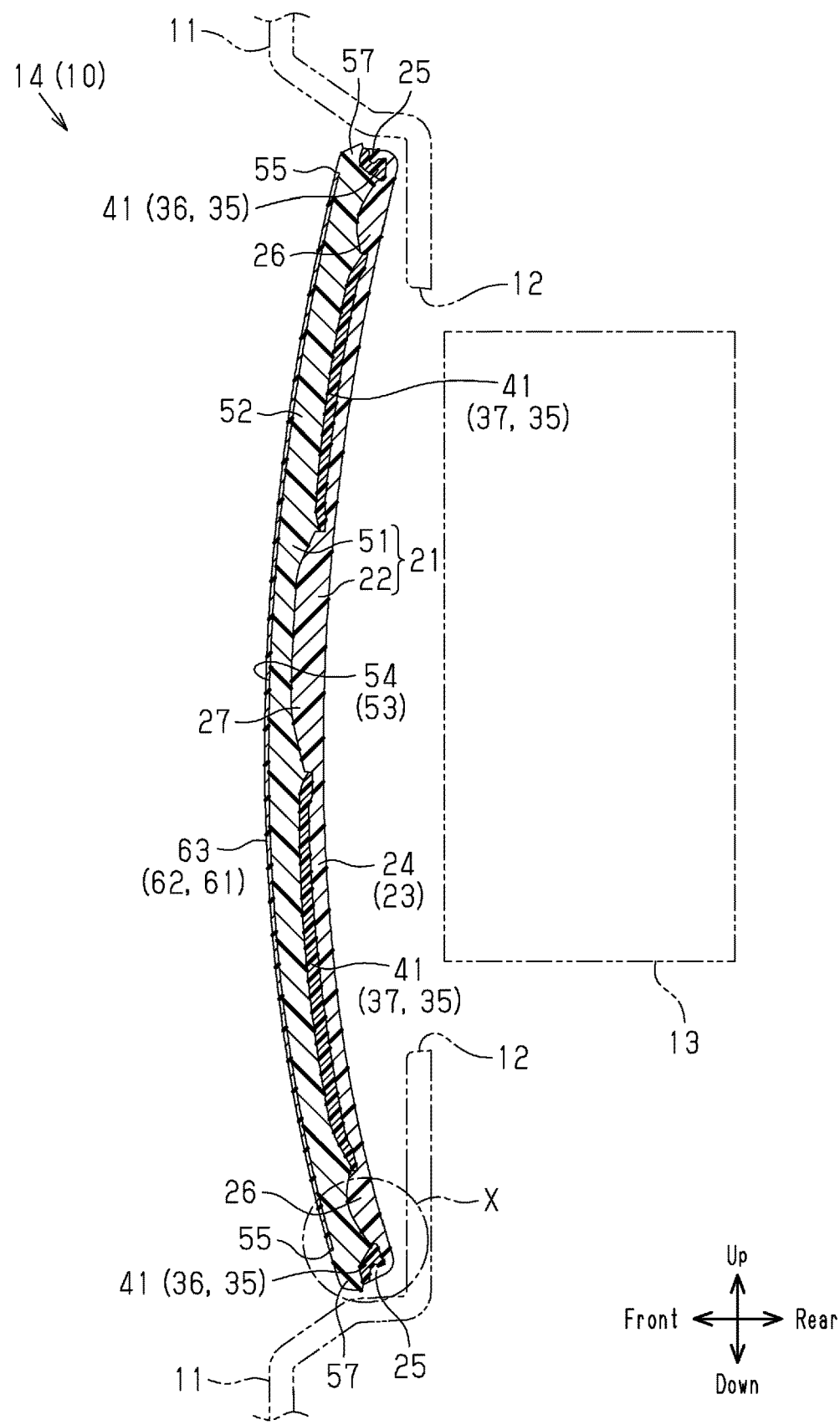
FIG. 3 is a cross-sectional side view showing the cross-sectional structure of the emblem in FIG. 1 taken along line 3-3, together with the millimeter wave radar device and part of the front grille.
Figure 4:
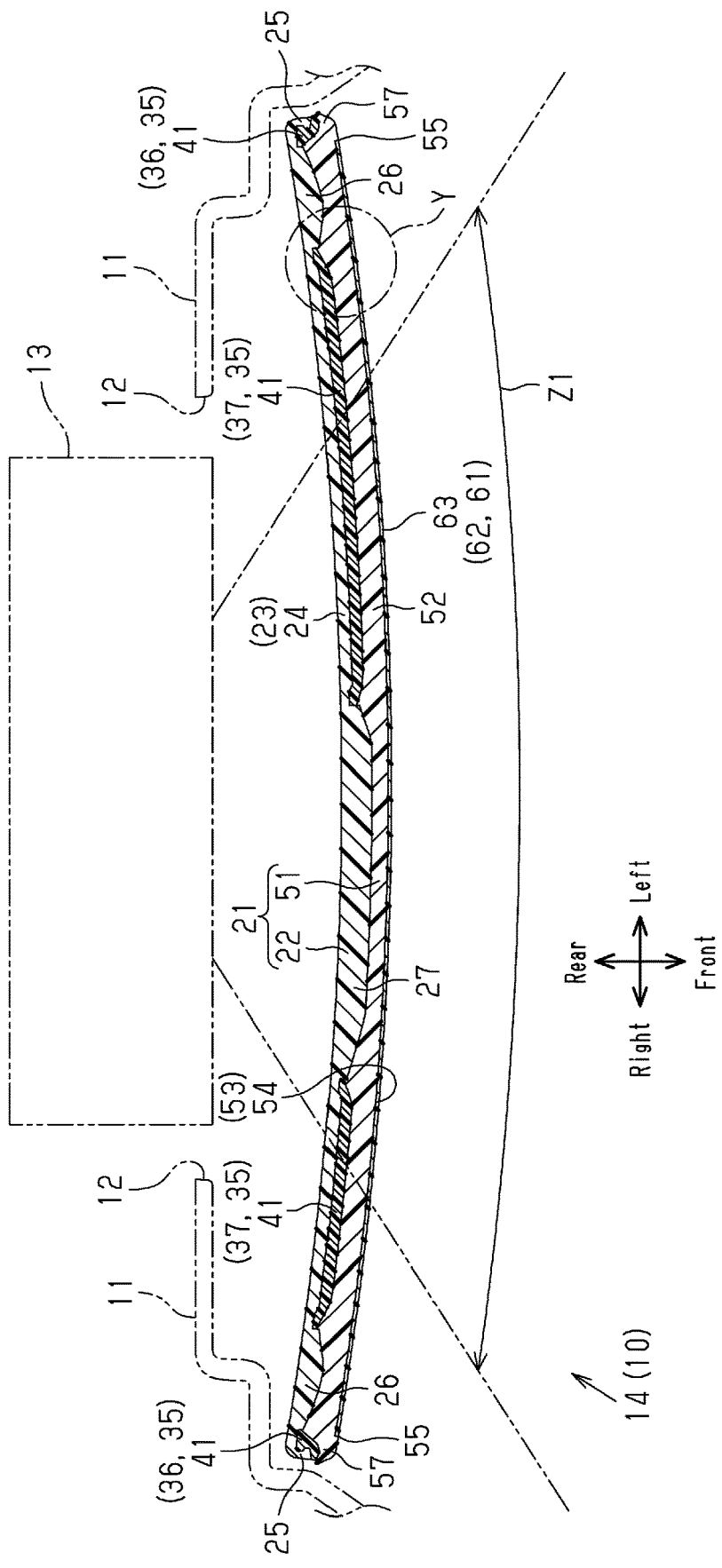
FIG. 4 is a cross-sectional plan view showing the cross-sectional structure of the emblem in FIG. 1 taken along line 4-4, together with the millimeter wave radar device and part of the front grille.

As shown in FIGS. 3 and 4, the vehicle 10 includes a front-monitoring millimeter wave radar device 13. The millimeter wave radar device 13 is located in the middle of the front part of the vehicle 10 in the left-right direction and located in the vicinity of the rear of a front grille 11. The millimeter wave radar device 13 functions to transmit millimeter waves (electromagnetic waves) toward the front of the vehicle and receive the millimeter waves that have struck and been reflected by an object outside the vehicle 10.

In the present embodiment, as described above, the direction in which the millimeter wave radar device 13 transmits millimeter waves corresponds to a direction from the rear toward the front of the vehicle 10. The front in the transmission direction of millimeter waves substantially matches the front of the vehicle 10. The rear in the transmission direction substantially matches the rear of the vehicle 10. Thus, the front in the transmission direction of millimeter waves is hereinafter simply referred to as "frontward" or "front," and the rear in the transmission direction is hereinafter simply referred to as "rearward" or "rear."

The front grille 11 includes a window 12 at a position in the vicinity of the millimeter wave radar device 13. The emblem 14 is arranged in front of the window 12 to, for example, decorate the vehicle 10. The emblem 14 covers the millimeter wave radar device 13 from the front. The emblem 14 is arranged upright such that its front surface is directed toward the front of the vehicle 10 and its rear surface is directed toward the rear of the vehicle 10.

Figure 5:
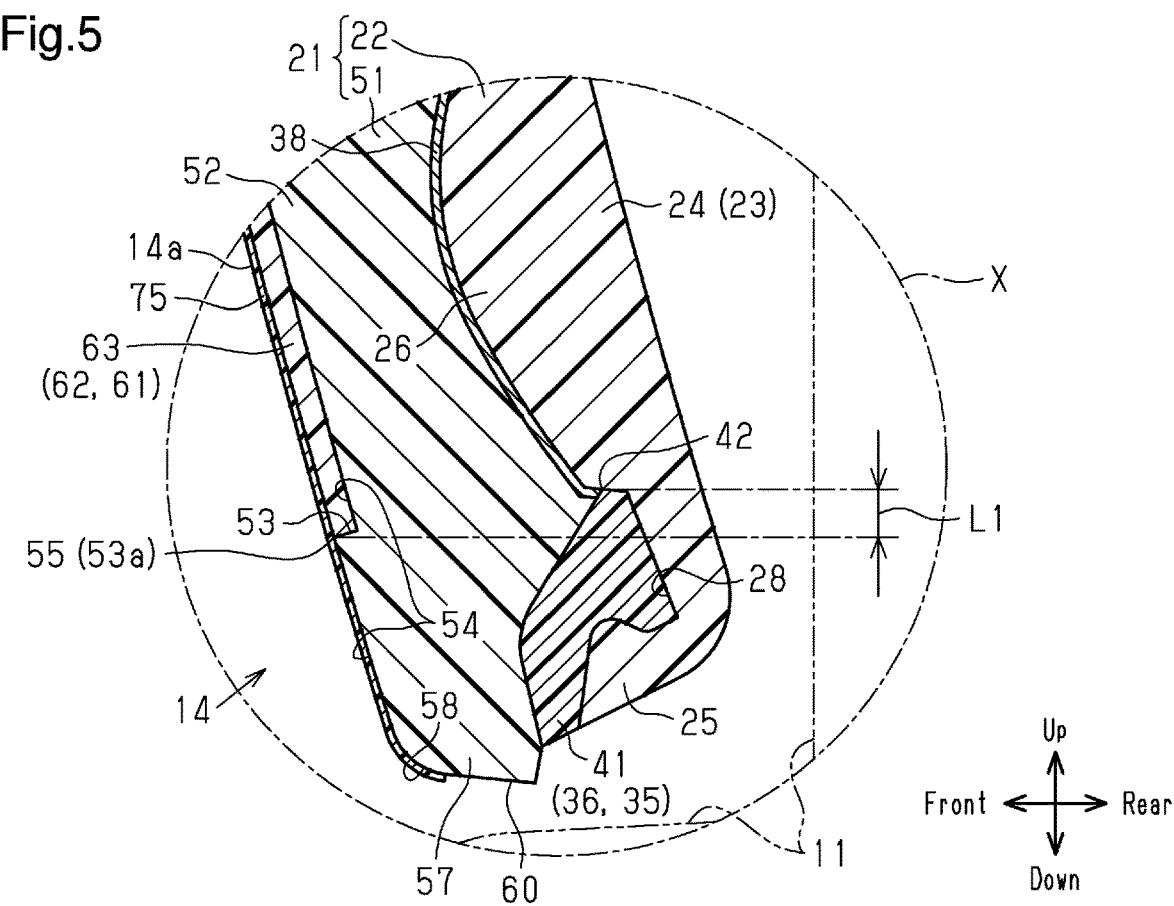
FIG. 5 is an enlarged partial cross-sectional side view showing section X in FIG. 3.

The emblem 14 includes a decoration body 21, a heater sheet 61, and a hard coating layer 75 (see, for example, FIG. 5). Each of the components of the emblem 14 will now be described.

Decoration Body 21

Figure 1:
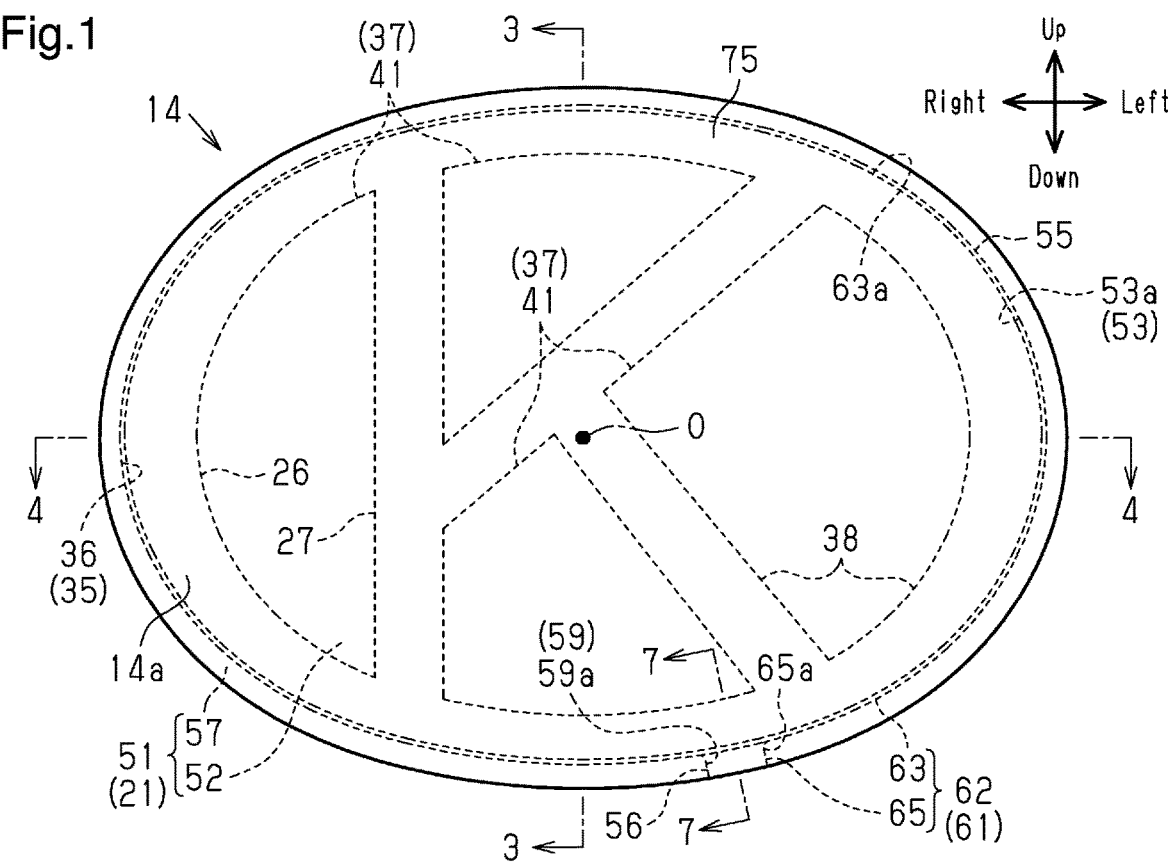
FIG. 1 is a front view showing a vehicle exterior part applied to an emblem according to an embodiment.

The decoration body 21 is a main part of the emblem 14. As shown in FIG. 1, when viewed from the front, the decoration body 21 has an oval shape in which its dimension is greater in the left-right direction than in the up-down direction.

The radial direction of the decoration body 21 includes a direction toward the center O (the intersection between the major and minor axes), which is referred to as "inward," and a direction away from the center O, which is referred to as "outward." The direction corresponding to the edge of the decoration body 21 is referred to as the circumferential direction.

As shown in FIG. 4, part of a region radially inward from the edge of the decoration body 21 is a passage region Z1 for millimeter waves transmitted from the millimeter wave radar device 13.

As shown in FIGS. 3 to 5, the decoration body 21 includes a layer structure in which layers are laminated in the front-rear direction. The layers each permit the passage of millimeter waves. The layers include a resin base 22 and a transparent resin layer 51.

Resin Base 22

The resin base 22 is the rear part of the decoration body 21. The resin base 22 includes a rear base portion 23 and a front base portion 35.

As shown in FIGS. 1 and 3 to 5, the rear base portion 23 includes a base 24, an annular engagement portion 25, an inner annular protrusion 26, and a character protrusion 27. The base 24 defines the entire rear part of the rear base portion 23. The annular engagement portion 25 protrudes frontward from the edge of the base 24 and has an oval shape. The annular engagement portion 25 has a hook-shaped cross-section. The inner annular protrusion 26 protrudes frontward from a portion of the base 24 that is located radially inward from the annular engagement portion 25. The inner annular protrusion 26 has an oval shape. The character protrusion 27 protrudes frontward from part of a region of the base 24 surrounded by the inner annular protrusion 26. The character protrusion 27 represents a character ("K" in the present embodiment). The region of the rear base portion 23 between the annular engagement portion 25 and the inner annular protrusion 26 is an annular recess 28 that opens frontward (see FIG. 5).

Figure 7:
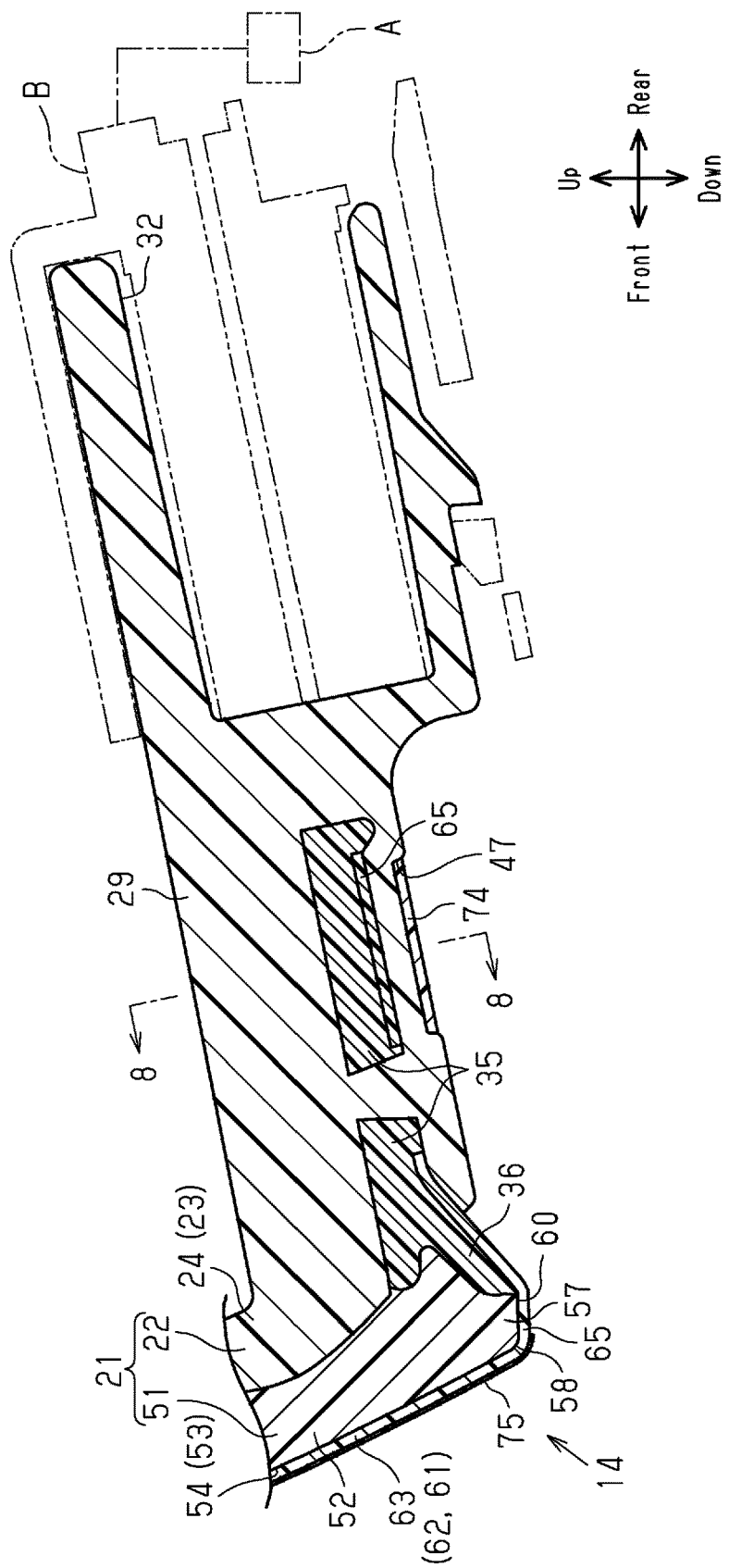

As shown in FIG. 7, the rear base portion 23 includes a socket 29 that protrudes rearward from the lower part of the base 24. The rear part of the socket 29 includes an attachment recess 32. The attachment recess 32 opens in the rear surface and is recessed frontward.

The rear base portion 23 is colored using acrylonitrile-ethylene-styrene (AES) copolymer resin. Instead, the rear base portion 23 may be made of, for example, acrylonitrile-styrene-acrylate (ASA) copolymer resin, polycarbonate (PC) resin, or polymer alloy of PC resin and acrylonitrile-butadiene-styrene (ABS) copolymer resin.

As shown in FIGS. 1 and 3 to 5, the front base portion 35 is arranged in front of the rear base portion 23. The front base portion 35 includes an outer annular portion 36 and a background portion 37.

The outer annular portion 36 is located in front of the annular engagement portion 25 and the annular recess 28. The outer annular portion 36 has an oval shape. The outer annular portion 36 is fitted to the annular recess 28 and engaged with the annular engagement portion 25. As shown in FIG. 7, part of the front base portion 35 extends rearward from the outer annular portion 36 into the socket 29.

As shown in FIGS. 1, 3, and 4, the background portion 37 is arranged is located in front of the base 24 and in a region different from the inner annular protrusion 26 and the character protrusion 27. The front base portion 35 is, for example, made of a composite material of PC resin and carbon black such that the front base portion 35 has a black color.

Figure 8:
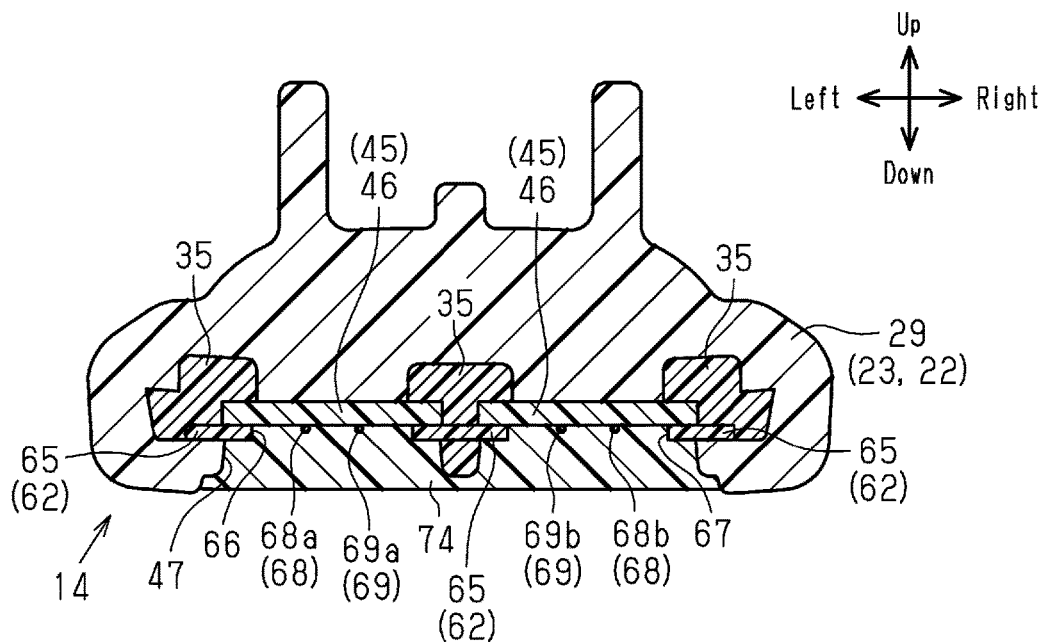
FIG. 8 is a cross-sectional view taken along line 8-8 in FIG. 7.

As shown in FIGS. 7 and 8, the socket 29 includes two connector pins 45. The two connector pins 45 are spaced apart from each other in the left-right direction and extend in the front-rear direction. The front part of each connector pin 45 is defined by a plate-shaped member 46. The rear part of each connector pin 45 is defined by a pin (not shown) that extends rearward from the plate-shaped member 46. Each plate-shaped member 46 is embedded in the socket 29. Part of each pin is arranged in the attachment recess 32. The lower part of the socket 29 includes a window 47 that opens in the lower surface of the socket 29.

Attachments (not shown) are arranged at positions of the outer portion of the rear surface of the resin base 22 to attach the emblem 14 to the front grille 11 or the vehicle body. The attachments include, for example, clips, screws, and engagement tabs.

Transparent Resin Layer 51

As shown in FIGS. 3 to 5 and 11, the transparent resin layer 51 is the frontmost part of the decoration body 21. The transparent resin layer 51 is made of a transparent resin material (PC resin in the present embodiment) and located in front of the resin base 22. The term "transparent" in this specification includes not only a colorless and transparent state, but also a colored and transparent state. The same applies to a sheet base 62 and the hard coating layer 75, which will be described later. The rear part of the transparent resin layer 51 is formed in correspondence with the shape of the front part of the resin base 22.

The transparent resin layer 51 includes a general portion 52 and an outer edge 57 located around the general portion 52. The transparent resin layer 51 includes a general surface 54 at the general portion 52 and the outer edge 57. The general surface 54 is gently curved so as to bulge frontward.

The general portion 52 includes a recess 53 that opens frontward. The depth of the recess 53 is substantially equal to the thickness of the sheet base 62, which will be described later. The inner bottom surface of the recess 53 defines part of the general surface 54.

The outer edge 57 includes a bend surface 58 that is curved to a larger extent than the general surface 54. The outer edge 57 includes part of the general surface 54 at a portion located inward from the bend surface 58 in the radial direction (i.e., at the surrounding portion of the recess 53). The outer edge 57 includes an outer circumferential surface 60 located outward from the bend surface 58 in the radial direction. In the present embodiment, the outer circumferential surface 60 is defined by a flat surface inclined with respect to the front-rear direction. Instead, the outer circumferential surface 60 may be defined by a surface that is curved or angular to a smaller extent than the bend surface 58.

The transparent resin layer 51 includes a groove 59 (see FIG. 1). The groove 59 extends from the recess 53 rearward through the outer edge 57. The groove 59 is located at a position that is circumferentially slightly separated from a position downward from the center O.

Instead of the PC resin, the transparent resin layer 51 may be made of a transparent resin material such as polymethyl methacrylate (PMMA) resin.

Figure 6:
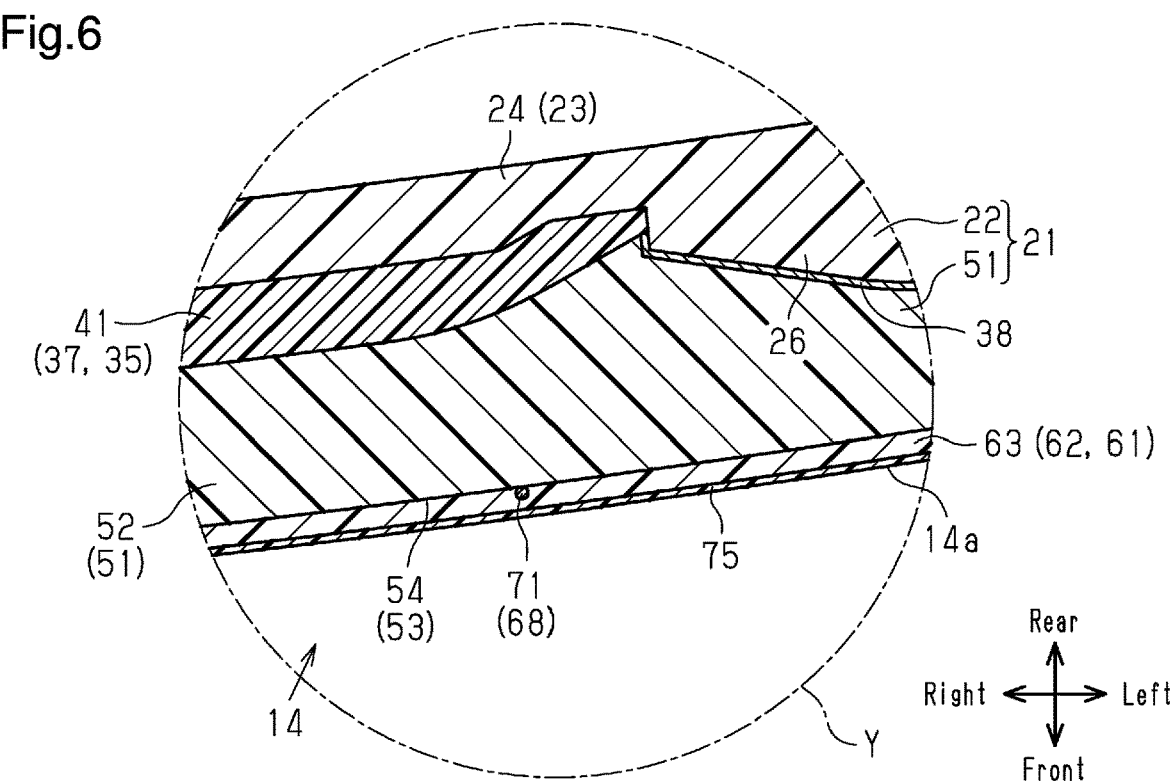
FIG. 6 is an enlarged partial cross-sectional plan view showing section Y in FIG. 4.

As shown in FIGS. 1, 5, and 6, a decorative layer is arranged behind the transparent resin layer 51 and between the rear base portion 23 and the transparent resin layer 51. The decorative layer includes a bright decorative layer 38 that has a high brightness and a colored decorative layer 41 that has a lower brightness than the brightness of the bright decorative layer 38. The bright decorative layer 38 is laminated at a position located in front of the inner annular protrusion 26 and the character protrusion 27. The bright decorative layer 38 is made of a metal material such as indium (In) and has an island-like structure. In the island-like structure, instead of metal coatings being continuous on the entire surfaces, a large number of fine metal coatings are densely laid out such that they are slightly spaced apart from one another or are in partial contact with one another like an island. In such a structure, the bright decorative layer 38 has a non-continuous structure, and therefore has a high electrical resistance and permits the passage of millimeter waves.

In FIGS. 3 and 4, the bright decorative layer 38 is not shown.

The decorative layer 41 is defined by the front base portion 35 having a black color.

In the passage region Z1 (see FIG. 4) for millimeter waves, the resin base 22 and the transparent resin layer 51 are arranged such that the entire thicknesses are constant.

Heater Sheet 61

Figure 2:
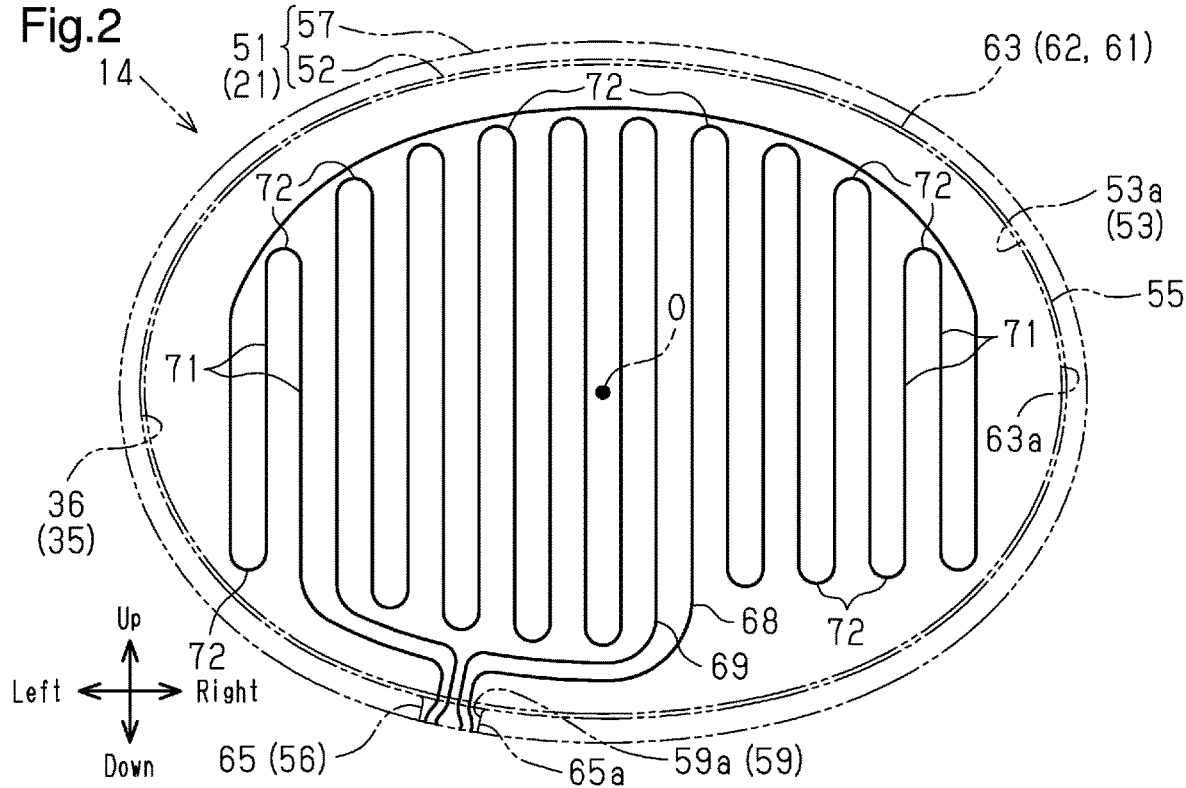
FIG. 2 is a rear view showing the heater wires of the emblem in FIG. 1, together with its surrounding portions.

Referring to FIGS. 2 to 4, the heater sheet 61 is used to add a snow-melting function to the emblem 14. The heater sheet 61 includes the sheet base 62 and two heater wires 68, 69 arranged on the sheet base 62 (see FIG. 6). The heater wires 68, 69 generate heat when energized.

Sheet Base 62

Figure 9:
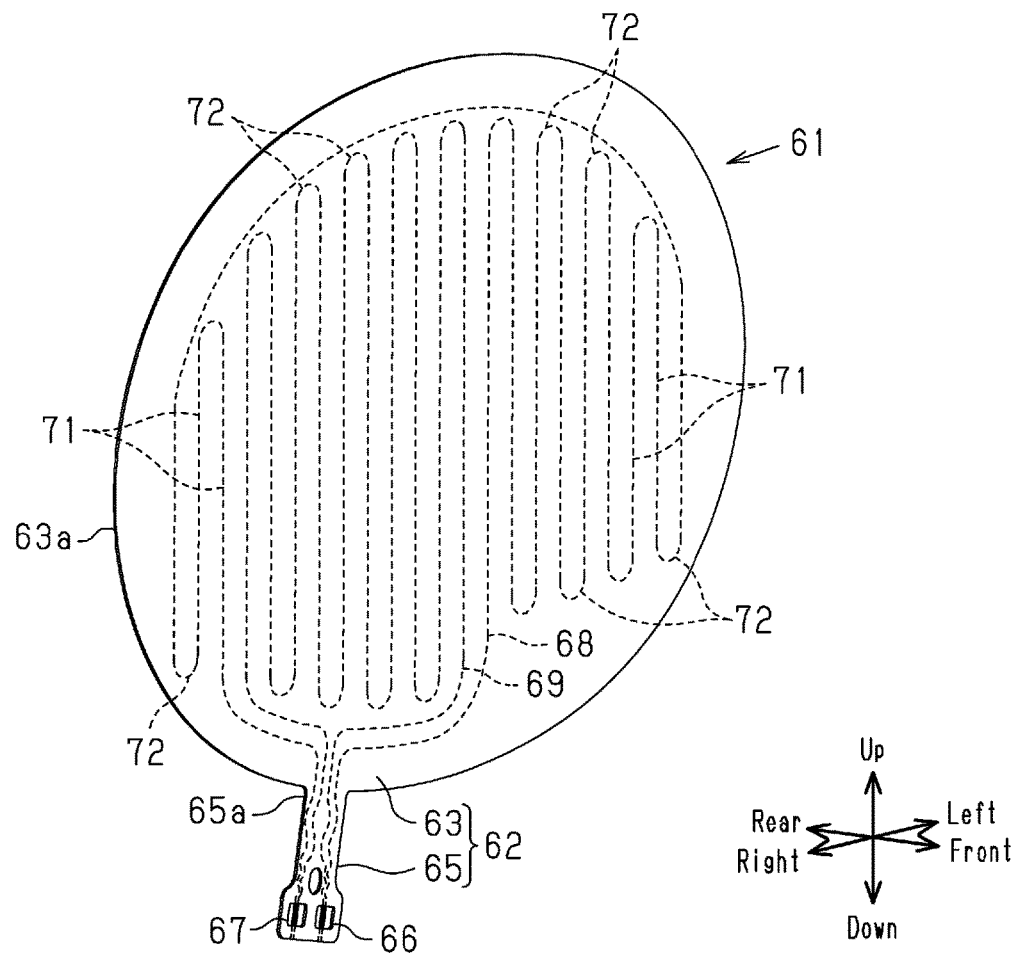
FIG. 9 is a perspective view showing the heater sheet prior to being formed in the embodiment.

Referring to FIG. 9, the sheet base 62 is made of a transparent resin material (e.g., PC resin). The sheet base 62 includes a body 63 and an extension 65. The body 63 is formed into a horizontally long oval shape in correspondence with the decoration body 21.

Figure 11:
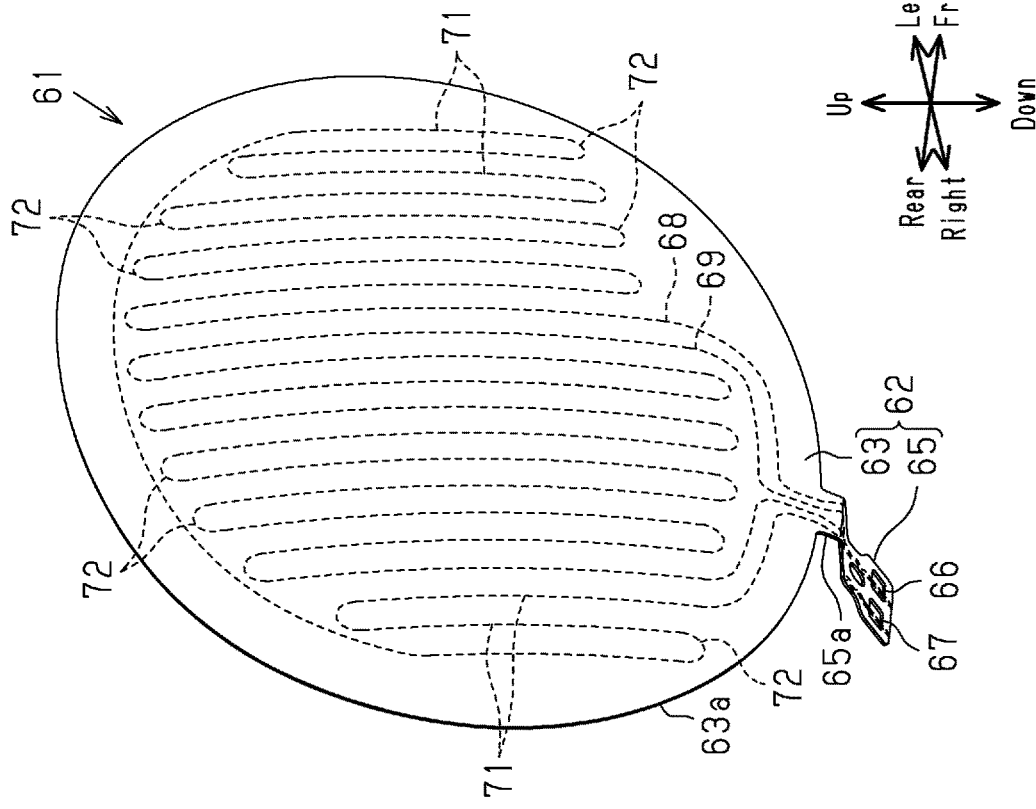
FIG. 11 is a perspective view showing the transparent resin layer in the embodiment.

Referring to FIGS. 7, 9, and 11, the extension 65 is a portion to which a power-supplying device A is electrically connected. The extension 65 extends from a portion of a periphery 63a of the body 63 that is circumferentially slightly deviated from a portion that is below the center O (see FIGS. 1 and 2). The extension 65 extends through the outer edge 57 and is located rearward from the general surface 54. The extension 65 is bent with respect to the body 63. Further, the extension 65 is arranged along, for example, the lower surface of the transparent resin layer 51 and the lower surface of the front base portion 35 such that the extension 65 is routed to the rear part of the transparent resin layer 51. As shown in FIGS. 2, 8, and 9, openings 66, 67 are arranged on the opposite sides of the extension 65 in the circumferential direction.

Heater Wires 68, 69

The heater wires 68, 69 are made of a metal material (e.g., copper) that generates heat when energized. The heater wires 68, 69 have an elongated shape. The two heater wires 68, 69 are arranged on the body 63 and the extension 65 of the sheet base 62. In the body 63, the heater wires 68, 69 are arranged on the rear surface of the body 63. In the body 63, the heater wires 68, 69 each include linear portions 71 and arcuate fold-back portions 72. The linear portions 71 extend in parallel to each other. Each fold-back portion 72 connects the ends of adjacent ones of the linear portions 71 to each other. The heater wires 68, 69 are arranged in different wiring patterns.

The heater wire 68 includes terminals 68a, 68b at its opposite ends. The heater wire 69 includes terminals 69a, 69b at its opposite ends. The terminals 68a, 69a are arranged together at a portion on one side (left side in FIG. 8) in the circumferential direction. Similarly, the terminals 68b, 69b are arranged together at a portion on the other side (right side in FIG. 8) in the circumferential direction.

Referring to FIGS. 7 to 9, the terminals 68a, 69a are joined to the corresponding plate-shaped member 46 in the opening 66 through soldering. Similarly, the terminals 68b, 69b are joined to the corresponding plate-shaped member 46 in the opening 67 through soldering. In this manner, the heater wire 69 is connected in parallel to the heater wire 68. Instead of such soldering, the joining may be performed through, for example, adhesion or welding using a conductive adhesive.

The window 47 includes a water preventing portion 74 that restricts water from entering the portions that have been joined in the above manner. The water preventing portion 74 is formed by filling the window 47 with a potting material that contains a softer resin material than that of the resin base 22.

As shown in FIGS. 1 and 2, the sheet base 62 including the body 63 is separate from the transparent resin layer 51 including the recess 53. This produces an elongated gap between the periphery 63a of the body 63 and an opening edge 53a of the recess 53. The gap is referred to as a parting line 55. Further, the sheet base 62 including the body 63 and the extension 65 is separate from the transparent resin layer 51 including the groove 59. This produces an elongated gap between the periphery of a boundary portion 65a of the extension 65 that is adjacent to the body 63 and an opening edge 59a of the groove 59. The gap is referred to as a parting line 56.

As shown in FIG. 5, the opening edge 53a of the recess 53 is located in front of the outer annular portion 36. In the present embodiment, the opening edge 53a is located at a position that satisfies the following condition 1.

Condition 1: The position is located closer to the outer annular portion 36 than a border 42 between the inner annular protrusion 26 (bright decorative layer 38) and the outer annular portion 36 (colored decorative layer 41). In this case, the position is separated radially outward by length L1.

Even when the total value of variations in, for example, the shapes of components is a possible maximum value, length L1 is set to a value at which the opening edge 53a is located in front of the outer annular portion 36 (colored decorative layer 41), instead of being located in front of the inner annular protrusion 26 (bright decorative layer 38). In the present embodiment, length is set to 0.2 mm.

Additionally, in the present embodiment, the body 63 and portions of the heater wires 68, 69 arranged on the rear surface of the body 63 are arranged on the heater sheet 61 so as to fill the recess 53. In this arrangement, the following condition 2 needs to be satisfied.

Condition 2: The front surface of the body 63 is located on the same plane as (is flush with) the general surface 54 at the surrounding portion of the recess 53.

In this arrangement, the body 63 and the portions of the heater wires 68, 69 arranged on the rear surface of the body 63 are located in front of only the general surface 54, which is defined by the inner bottom surface of the recess 53, on the front surface of the transparent resin layer 51.

As shown in FIGS. 1, 2, 9, and 10, the boundary portion 65a of the extension 65 and portions of the heater wires 68, 69 arranged on the boundary portion 65a are arranged so as to fill the groove 59. In this arrangement, the following condition 3 is satisfied.

Condition 3: The front surface of the boundary portion 65a is located on the same plane as (is flush with) the bend surface 58 and the general surface 54 at the surrounding portion of the groove 59 in the transparent resin layer 51 (see FIG. 11).

Referring to FIGS. 5 and 6, the hard coating layer 75 is made of, for example, a transparent resin material. The hard coating layer 75 is located on at least, for example, the front surface of the body 63, the front surface (general surface 54) at the surrounding portion of the recess 53 in the transparent resin layer 51, and the bend surface 58. The front surface of the hard coating layer 75 defines an ornamental surface 14a of the emblem 14. When force is applied to the emblem 14 from the outside, the hard coating layer 75 receives that force. This prevents the damage to members that are located rearward from the hard coating layer 75. In FIGS. 3 and 4, the hard coating layer 75 is not shown.

As shown in FIGS. 3 and 4, the emblem 14 is arranged upright in front of the window 12 and coupled to the front grille 11 or the vehicle body at the attachments.

Further, when a plug B of the device A is inserted into the attachment recess 32 of the socket 29 from the rear side of the emblem 14 as shown in FIG. 7, the heater wires 68, 69 are electrically connected to the device A.

The operation of the present embodiment will now be described. The advantages resulting from the operation will also be described.

(1) Forming Body 63 into Shape that Corresponds to Front Surface of Transparent Resin Layer 51

As shown in FIGS. 3 to 5, the heater sheet 61 is arranged in close contact with the transparent resin layer 51. Due to this arrangement, the body 63 of the sheet base 62 needs to have a shape that corresponds to the shape of the front surface of the transparent resin layer 51.

The general surface 54 is curved in a relatively gentle manner. Thus, it is relatively easy to form the body 63 into a shape that corresponds to the general surface 54. In contrast, the bend surface 58 of the outer edge 57 is curved to a larger extent than the general surface 54. Thus, it is difficult to accurately form the body 63 into a shape that corresponds to the bend surface 58.

Additionally, when the heater sheet 61 is used as an insert to form the transparent resin layer 51 by molding resin, the following problem would occur. It would be difficult to accurately arrange, in a portion of a mold that has a shape corresponding to the bend surface 58, the body 63 formed into a shape corresponding to the bend surface 58 as described above, while maintaining the formed shape of the body 63.

Figure 10:
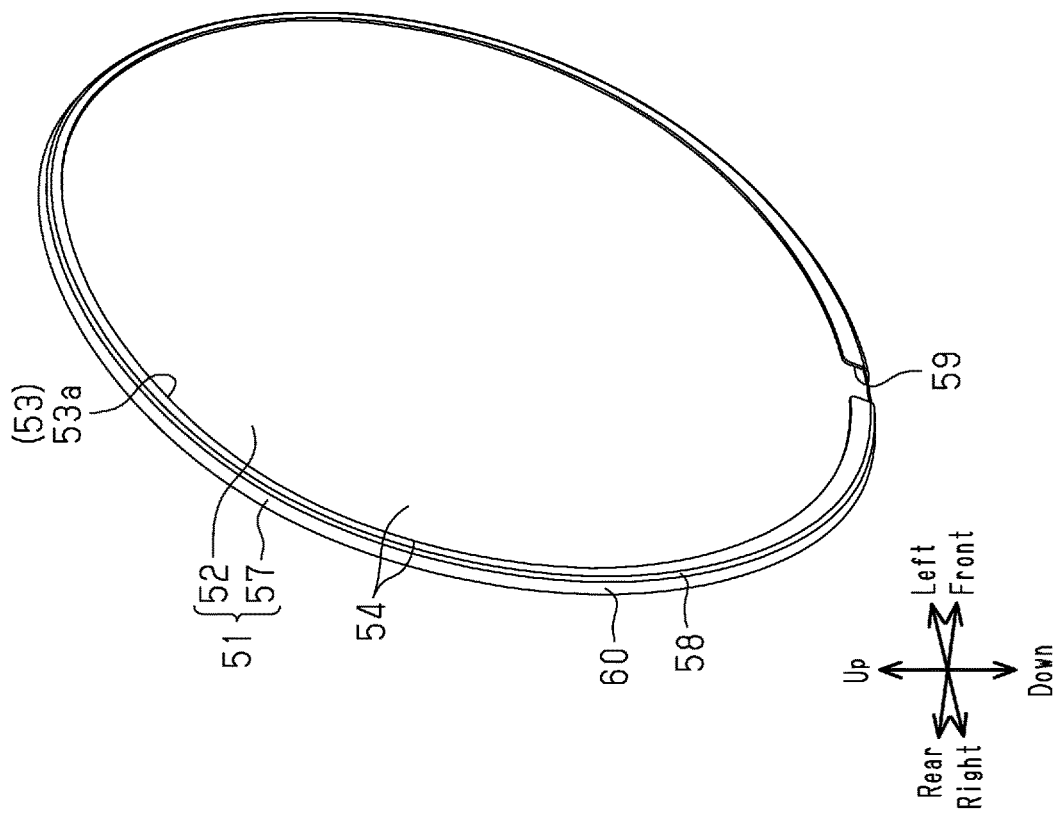
FIG. 10 is a perspective view showing the heater sheet subsequent to being formed in the embodiment.

In the present embodiment, the body 63 and the portions of the heater wires 68, 69 on the rear surface of the body 63 are located in front of only the general surface 54. Accordingly, as shown in FIG. 10, for the body 63 to have a shape corresponding to the shape of the front surface of the transparent resin layer 51, the body 63 only needs to be formed into a shape corresponding to only the general surface 54 of the recess 53. Thus, the body 63 does not need to be formed into a shape corresponding to the bend surface 58.

Figure 12:
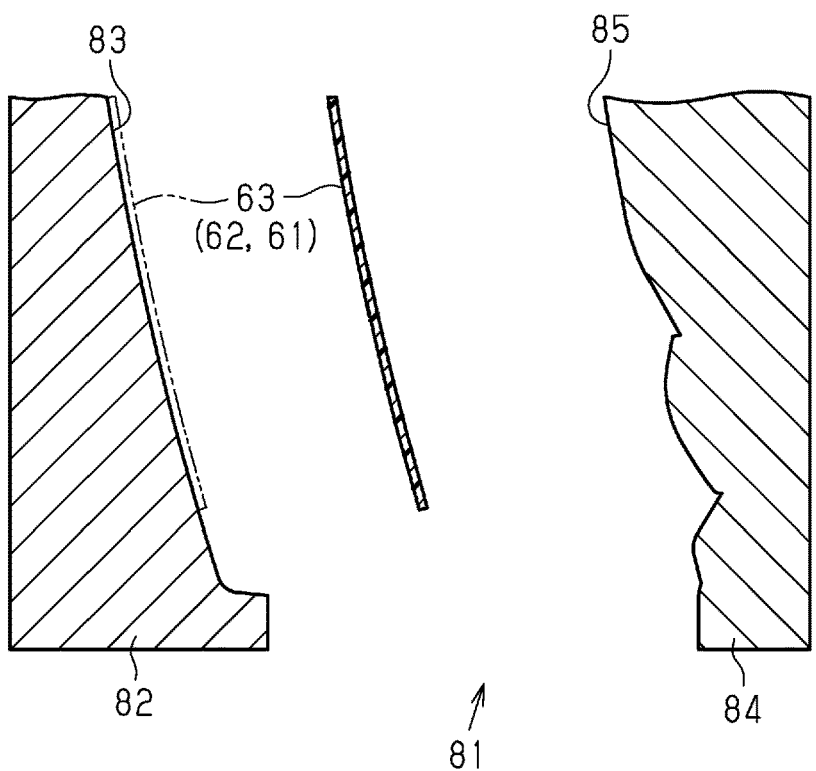
FIG. 12 is a diagram illustrating a process that insert-molds the transparent resin layer in the embodiment and showing a state before the heater sheet is arranged in a mold.
Figure 13:
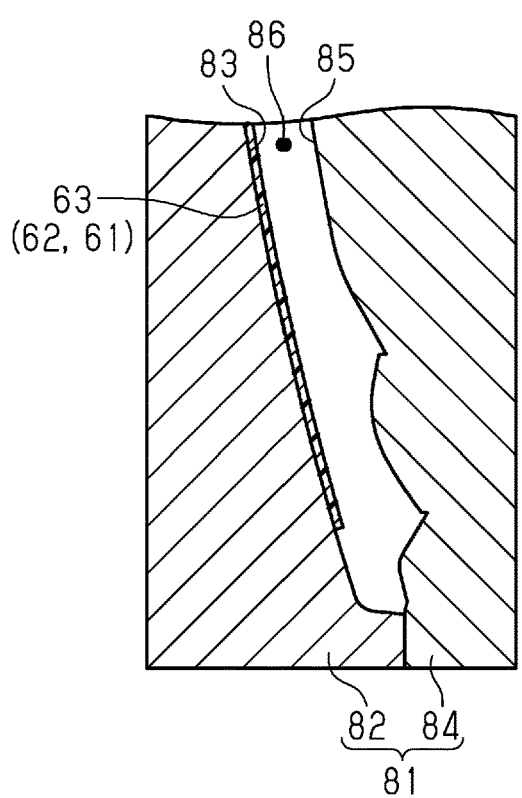
FIG. 13 is a diagram illustrating the process that insert-molds the transparent resin layer in the embodiment and showing a state in which the heater sheet is arranged in the mold of FIG. 12 and the mold is locked.

To insert-mold the transparent resin layer 51, for example, a mold 81 is used as shown in FIGS. 12 and 13. The mold 81 includes a fixed die 82 and a movable die 84 that moves toward and separates from the fixed die 82. The fixed die 82 includes an arrangement surface 83 on which the body 63 is arranged. The movable die 84 includes a molding surface 85. The shape of the molding surface 85 corresponds to the shape of the rear surface of the transparent resin layer 51.

As shown in FIG. 12, when the movable die 84 is separated from the fixed die 82, the mold 81 opens. The heater sheet 61 is arranged on the arrangement surface 83 of the fixed die 82.

In the present embodiment, the body 63 subsequent to the above forming does not include a portion that is curved to a larger degree than the general surface 54 in correspondence with the bend surface 58. This eliminates the need to maintain the portion of the body 63 to a shape corresponding to the bend surface 58. Thus, the body 63 only needs to be maintained to a shape corresponding to the general surface 54. This allows the heater sheet 61 to be easily arranged on the arrangement surface 83.

As shown in FIG. 13, when the movable die 84 is moved toward the fixed die 82 on which the heater sheet 61 is arranged, the mold 81 is closed. This produces a cavity 86 between the fixed die 82 including the body 63 and the movable die 84. Filling the cavity 86 with a molten resin material and hardening the resin material form the transparent resin layer 51.

In contrast to the above structure of the mold 81, the die that includes the arrangement surface 83 may be a movable die and the die that includes the molding surface 85 may be a fixed die.

(2) Passage of Millimeter Waves

When millimeter waves are transmitted from the millimeter wave radar device 13, the millimeter waves pass through the decoration body 21, heater sheet 61, and hard coating layer 75 in this order as shown in FIGS. 3 to 6. The millimeter waves that have passed through strike and are reflected by an object in front of the vehicle 10 including, for example, a vehicle leading the vehicle 10 and pedestrians. Then, the millimeter waves pass through the hard coating layer 75, heater sheet 61, and decoration body 21 in this order, which is opposite from the above order, and are received by the millimeter wave radar device 13. Using the transmitted and received millimeter waves, the millimeter wave radar device 13 recognizes an object and detects the distance between the vehicle 10 and the object, the relative speed, and the like.

(3) Melting Function

When ice and snow adhere to the emblem 14 shown in FIGS. 5 and 6, mainly to the ornamental surface 14*a*, millimeter waves attenuate. This lowers the detection performance of the millimeter wave radar device 13. In the present embodiment, as shown in FIG. 7, power is supplied from the device A to the heater wires 68, 69 (shown in FIGS. 2 and 10) through the plug B and the connector pin 45.

(3-1) When current is supplied to the heater wires 68, 69 that have been supplied with power, the heater wires 68, 69 generate heat. Some of the heat generated by the heater wires 68, 69 is transferred to the components including the ornamental surface 14*a* of the emblem 14. This melts the ice and snow that adhere to the ornamental surface 14*a* and the like. Thus, the detection performance of the millimeter wave radar device 13 is prevented from being lowered due to the adhesion of ice and snow.

(3-2) Particularly, in the present embodiment, as shown in FIGS. 5 and 6, the heater sheet 61 is arranged at the frontmost part of the emblem 14, excluding the hard coating layer 75. This allows the heat generated by the heater wires 68, 69 to be easily transferred to the ornamental surface 14*a*. As a result, the ice and snow that adhere to the ornamental surface 14*a* are efficiently melted.

(4) Appearance of Emblem 14

When visible light is applied to the emblem 14 (shown in FIGS. 3 to 6) from the front side of the vehicle 10, the visible light passes through the hard coating layer 75, which is transparent, and is applied to the heater sheet 61. The visible light passes through the body 63 of the sheet base 62. The visible light that has been applied to the heater wires 68, 69 is reflected, whereas the visible light that is not applied to the heater wires 68, 69 passes through the transparent resin layer 51. Referring to FIGS. 1 to 4, the visible light that has passed through the transparent resin layer 51 and has been applied to the bright decorative layer 38, which is laminated on the inner annular protrusion 26 and the character protrusion 27, is reflected. In contrast, the visible light that has passed through the transparent resin layer 51 and has then applied to the outer annular portion 36 and the background portion 37 of the front base portion 35 is absorbed.

(4-1) Thus, when the emblem 14 is viewed from the front, the inner annular protrusion 26, character protrusion 27, outer annular portion 36, and background portion 37 are seen through the hard coating layer 75, heater sheet 61, and transparent resin layer 51 as if the inner annular protrusion 26, character protrusion 27, outer annular portion 36, and background portion 37 are located on the rear sides of the hard coating layer 75, heater sheet 61, and transparent resin layer 51. Further, the outer annular portion 36 and the background portion 37 look black, and the inner annular protrusion 26 and the character protrusion 27 look shiny. That is, the inner annular protrusion 26 and the character protrusion 27 look like metal against the black outer annular portion 36 and background portion 37. The emblem 14 and its surrounding portions are decorated in this manner. As a result, the appearance of the emblem 14 is improved.

(4-2) The resin base 22 is located frontward from the millimeter wave radar device 13, and functions to cover the millimeter wave radar device 13. Thus, the millimeter wave radar device 13 is hard to see from the front of the emblem 14. This improves the appearance of the emblem 14, as compared with when the millimeter wave radar device 13 looks transparent through the emblem 15.

(4-3) As shown in FIG. 5, the parting line 55 is located in front of the transparent resin layer 51. Thus, the parting line 55 is seen from the front of the emblem 14. This may lower the aesthetic appeal of the emblem 14.

If the parting line 55 is located in front of the bright decorative layer 38, which is laminated on the inner annular protrusion 26, in order to minimize the size of the body 63, the parting line 55 may be seen on the bright decorative layer 38. Further, when visible light passes through the body 63 and is reflected on the bright decorative layer 38, the visible light is bright. This may make the parting line 55 noticeable.

In the present embodiment, the parting line 55 is located in front of the colored decorative layer 41 (outer annular portion 36). The colored decorative layer 41 has a lower brightness than the brightness of the bright decorative layer 38. This limits situations in which the parting line 55 is seen on the colored decorative layer 41. Even when visible light passes through the body 63 and is applied to the colored decorative layer 41, the colored decorative layer 41 is darker than the bright decorative layer 38. This makes the parting line 55 less noticeable.

(4-4) Particularly, in the present embodiment, the opening edge 53a of the recess 53 is located at a position that satisfies the above condition 1. This allows the parting line 55 to be located in front of the colored decorative layer 41 (outer annular portion 36) even when the total value of variations in, for example, the shapes of components is the possible maximum value. Thus, the above advantage (4-3) is gained.

(4-5) In the present embodiment, the outer annular portion 36 of the colored decorative layer 41 is black, which is deeper than the color of the bright decorative layer 38. Thus, when the emblem 14 is viewed from the front, the parting line 55 hides in the black-colored decorative layer 41. This makes the parting line 55 less noticeable.

Since the parting line 56 is located in front of the outer annular portion 36, the parting line 56 produces the same advantage.

(4-6) In the present embodiment, the body 63 and the portions of the heater wires 68, 69 on the rear surface of the body 63 are arranged so as to fill the recess 53. In this arrangement, the above condition 2 is satisfied.

Thus, referring to FIG. 5, the formation of a step is limited between the front surface of the body 63 and the general surface 54 at the surrounding portion of the recess 53 in the transparent resin layer 51. Thus, when the emblem 14 is viewed from the front, the parting line 55 becomes less noticeable than when a step is formed.

(4-7) In the present embodiment, as shown in FIGS. 9 to 11, the boundary portion 65a of the extension 65 and the portions of the heater wires 68, 69 on the rear surface of the boundary portion 65a are arranged so as to fill the groove 59. In this arrangement, the above condition 3 is satisfied. Thus, the formation of a step is limited between the front surface of the boundary portion 65a and the section that includes the general surface 54 and the bend surface 58 at the surrounding portion of the groove 59 in the transparent resin layer 51. Thus, when the emblem 14 is viewed from the front, the parting line 56 becomes less noticeable than when a step is formed.

In addition to the ones listed above, the present embodiment provides the following advantages.

(5-1) In the decoration body 21, the outer annular portion 36 is located radially outward from the inner annular protrusion 26, and the parting line 55 is located in front of the outer annular portion 36. Thus, the body 63 is larger than when the parting line 55 is located in front of the inner annular protrusion 26. This increases the area of the rear surface of the body 63 on which the heater wires 68, 69 are arranged. Accordingly, in the present embodiment, the heater wires 68, 69 are arranged on the body 63 with a larger degree of freedom.

(5-2) The body 63 of the present embodiment is smaller than a body 63 arranged on the entire front surface of the transparent resin layer 51. Thus, as long as the heater wires 68, 69 on the body 63 have the same length, the body 63 of the present embodiment has a higher efficiency of generating heat as compared with when the body 63 is arranged on the entire front surface of the transparent resin layer 51. The smaller body 63 and the higher heat-generating efficiency lower the cost of the emblem 14.

The above embodiment may be modified as follows. The above embodiment and the following modifications can be combined as long as the combined modifications remain technically consistent with each other.

Decoration Body 21

The color of the front base portion 35 does not have to be black and may be deep color (e.g., navy blue).

The bend surface 58 of the outer edge 57 may be angular with respect to the general surface 54 to a larger extent than the general surface 54.

The colored decorative layer 41 may be formed through printing (e.g., screen printing), hot stamping, or the like.

The general surface 54 of the transparent resin layer 51 does not have to be curved and may be flat.

In the embodiment, the transparent resin layer 51 includes the recess 53. In such a case, the general surface 54 only needs to include at least the inner bottom surface of the recess 53 and the front surface at the surrounding portion of the recess 53 in the transparent resin layer 51. The general surface 54 may additionally include the surfaces of other portions.

In FIG. 1, the shape of the decoration body 21 as viewed from the front may be different from that of the embodiment. For example, the decoration body 21 may have a circular or polygonal shape.

The recess 53 may be arranged on the entire general portion 52 or on part of the general portion 52 in the radial direction.

The recess 53 and the groove 59 do not necessarily have to be arranged in the transparent resin layer 51. At least one of the recess 53 and the groove 59 may be omitted.

The bend surface 58 may be arranged on the entire outer edge 57 or on part of the outer edge 57 in the front-rear direction.

Heater Sheet 61

In FIGS. 1, 2, and 9, the extension 65 of the sheet base 62 may extend from a position of the periphery 63a of the body 63 that is different from the position in the embodiment. Instead, the extension 65 may extend from, for example, a position below, above, or beside the center O.

The heater wires 68, 69 may each be formed by using a conducting wire made of a metal material (e.g., copper) as described above and a synthetic resin cover that covers and protects the conducting wire.

The heater wires 68, 69 may each be formed by performing, for a foil (e.g., copper or silver) bonded to the sheet base 62, a photolithography process using a photomask and then removing an unnecessary part.

Alternatively, the heater wires 68, 69 may each be formed by patterning, through etching, a metal (e.g., copper or silver) coat that is formed on the sheet base 62 through plating.

The number of the heater wires 68, 69 of the heater sheet 61 may be changed to one or may be changed to three or more.

The heater wires 68, 69 of the body 63 of the heater sheet 61 may be arranged in a pattern that differs from the pattern in the above embodiment.

Hard Coating Layer 75

When the sheet base 62 is thick enough to protect the heater wires 68, 69 and the like, the hard coating layer 75 may be omitted.

Others

The above vehicle exterior part is applicable as long as it is incorporated in a vehicle including a device that transmits and receives electromagnetic waves used to detect an object outside the vehicle and the heater sheet 61 is arranged in front of the decoration body 21. Examples of the electromagnetic waves transmitted and received by the device include millimeter waves and infrared rays.

The device that transmits and receives electromagnetic waves used to detect an object outside the vehicle does not have to be a front-monitoring device. Instead, the device may be a rear-monitoring device, a side-monitoring device for the front section, or a side-monitoring device for the rear section. The vehicle exterior part is arranged in front of the device in the direction in which electromagnetic wave are transmitted.

The above vehicle exterior part may be incorporated in a vehicle that does not include a device that transmits and receives electromagnetic waves used to detect an object outside the vehicle.

The above vehicle exterior part is applicable to not only the emblem 14 but also a vehicle exterior part, such as an ornament or a mark, that functions to decorate the vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle exterior part, comprising:
   a decoration body configured to decorate a vehicle, the decoration body including a layer structure that is formed by laminating layers in a front-rear direction; and
   a heater sheet that includes a transparent sheet base and a heater wire that is arranged on the sheet base, the heater wire generating heat when energized, wherein
   the decoration body includes a transparent resin layer at a frontmost part of the decoration body and a decorative layer located rearward from the transparent resin layer,
   the transparent resin layer includes a general portion and an outer edge located around the general portion,
   a front surface of the general portion includes a general surface, the general surface being flat or curved,
   the outer edge includes a bend surface, the bend surface being curved or angular to a larger extent than the general surface,
   the sheet base includes a body located in front of the transparent resin layer and an extension extending from a periphery of the body,
   the heater wire is arranged on the body and the extension, the heater wire being supplied with power at the extension,
   in the front-rear direction, an entirety of the body and an entirety of a portion of the heater wire arranged on the body overlap with the general surface,
   the general portion includes a recess that opens frontward,
   at least part of the general surface includes an inner bottom surface of the recess and a front surface at a surrounding portion of the recess in the transparent resin layer,
   in the body, the heater wire is arranged on a rear surface of the body, and
   the body and the portion of the heater wire arranged on the body are arranged so as to fill the recess such that a front surface of the body is located on a same plane as the general surface at the surrounding portion of the recess.

2. The vehicle exterior part according claim 1, wherein the transparent resin layer includes a groove that extends from the recess rearward through the outer edge,
   the extension includes a boundary portion adjacent to the body,
   in the boundary portion, the heater wire is arranged on a rear surface of the boundary portion, and
   the boundary portion and a portion of the heater wire arranged on the boundary portion are arranged so as to fill the groove such that a front surface of the boundary portion is located on a same plane as the general surface and the bend surface at a surrounding portion of the groove in the transparent resin layer.

3. The vehicle exterior part according claim 1, wherein the decorative layer includes a bright decorative layer that has a brightness and a colored decorative layer that has a lower brightness than the brightness of the bright decorative layer, and
   a parting line between the periphery of the body and an opening edge of the recess is located in front of the colored decorative layer.

4. The vehicle exterior part according to claim 3, wherein the colored decorative layer has a deeper color than a color of the bright decorative layer.

* * * * *